United States Patent
Liu et al.

(10) Patent No.: US 10,241,857 B2
(45) Date of Patent: Mar. 26, 2019

(54) METHOD, APPARATUS AND SYSTEM FOR AUTOMATICALLY REPAIRING DEVICE

(71) Applicant: XIAOMI INC., Beijing (CN)

(72) Inventors: Guoming Liu, Beijing (CN); Xibei Zhang, Beijing (CN); Juntao Liu, Beijing (CN)

(73) Assignee: XIAOMI INC., Beijing (CN)

( * ) Notice: Subject to any disclaimer, the term of this patent is extended or adjusted under 35 U.S.C. 154(b) by 133 days.

(21) Appl. No.: 15/342,269

(22) Filed: Nov. 3, 2016

(65) Prior Publication Data

US 2017/0153938 A1   Jun. 1, 2017

(30) Foreign Application Priority Data

Nov. 27, 2015 (CN) .......................... 2015 1 0846937

(51) Int. Cl.
*G06F 11/07* (2006.01)
*G05B 23/02* (2006.01)
(Continued)

(52) U.S. Cl.
CPC .......... *G06F 11/0793* (2013.01); *G05B 23/02* (2013.01); *G06F 11/0733* (2013.01);
(Continued)

(58) Field of Classification Search
CPC . G05B 23/02; G06F 11/0733; G06F 11/0736; G06F 11/0742; G06F 11/0748; G06F 11/079; G06F 11/0793
See application file for complete search history.

(56) References Cited

U.S. PATENT DOCUMENTS 6,487,677 B1 * 11/2002 Jantz ................... G06F 11/0748
  714/2
7,016,808 B2 * 3/2006 Obert .................. G06F 11/0733
  702/181

(Continued)

FOREIGN PATENT DOCUMENTS

CN   101631324 A   1/2010
CN   102045445 A   5/2011
(Continued)

OTHER PUBLICATIONS

International Search Report issued in PCT Application No. PCT/CN2016/082684, dated Aug. 26, 2016, 13 pages.
(Continued)

*Primary Examiner* — Joseph R Kudirka
(74) *Attorney, Agent, or Firm* — Arch & Lake LLP

(57) ABSTRACT

A method, an apparatus, and a system are provided for automatically repairing a smart device in the field of computer technology. In the method, the apparatus receives a fault detection request transmitted by the smart device, the fault detection request carrying at least one current value of at least one preset parameter item of the smart device. The apparatus determines whether the at least one current value is within a preset range according to a first value characteristic. When it is determined that the at least one current value is within the preset range, the apparatus obtains first fault repair information corresponding to the first value characteristic from a correspondence table. The apparatus transmits the first fault repair information to the smart device, so that the smart device is automatically repaired according to the first fault repair information.

15 Claims, 10 Drawing Sheets

(51) Int. Cl.
*G06F 11/32* (2006.01)
*G06Q 10/00* (2012.01)

(52) U.S. Cl.
CPC ...... *G06F 11/0742* (2013.01); *G06F 11/0748* (2013.01); *G06F 11/32* (2013.01); *G06Q 10/20* (2013.01)

(56) References Cited

U.S. PATENT DOCUMENTS

| | | | | |
|---|---|---|---|---|
| 7,617,423 | B2 * | 11/2009 | Patel | G06F 11/0742 455/423 |
| 7,827,446 | B2 * | 11/2010 | Kimura | G06F 11/0709 714/26 |
| 8,104,087 | B2 * | 1/2012 | Quinn | G06F 11/0748 717/172 |
| 8,473,779 | B2 * | 6/2013 | Siewert | G06F 11/2094 711/118 |
| 8,719,634 | B2 | 5/2014 | Cowie et al. | |
| 2003/0097617 | A1 | 5/2003 | Goeller | |
| 2004/0153823 | A1 | 8/2004 | Ansari | |
| 2005/0066236 | A1 | 3/2005 | Goeller et al. | |
| 2005/0283638 | A1 | 12/2005 | Kato | |
| 2008/0046786 | A1 | 2/2008 | Patel et al. | |
| 2008/0133979 | A1 | 6/2008 | Lee et al. | |
| 2013/0311836 | A1 * | 11/2013 | Hurst | G06F 11/0742 714/48 |
| 2016/0034359 | A1 * | 2/2016 | Cabrera | G06F 11/1464 714/19 |

FOREIGN PATENT DOCUMENTS

| | | |
|---|---|---|
| CN | 103062862 A | 4/2013 |
| CN | 103400225 A | 11/2013 |
| CN | 104506886 A | 4/2015 |
| CN | 104601401 A | 5/2015 |
| CN | 104993973 A | 10/2015 |
| CN | 105527511 A | 4/2016 |
| JP | 2001216423 A | 8/2001 |
| JP | 2001223696 A | 8/2001 |
| JP | 2003198746 A | 7/2003 |
| RU | 2501073 A | 12/2013 |
| RU | 2557771 A | 7/2015 |
| WO | 2013/152190 A1 | 10/2013 |
| WO | WO-2016010237 A1 * | 1/2016 ............. D06F 39/00 |

OTHER PUBLICATIONS

Extended European Search Report issued in corresponding European Patent Application No. 16 18 7532, dated Nov. 17, 2016, 8 pages.

English translation of International Preliminary Report on Patentability issued in corresponding International Applicatio No. PCT/CN2016/082684, dated May 29, 2018, 6 pages.

International Preliminary Report on Patentability issued in corresponding International Application No. PCT/CN2016/082684, dated May 29, 2018, 5 pages.

* cited by examiner

METHOD, APPARATUS AND SYSTEM FOR AUTOMATICALLY REPAIRING DEVICE

CROSS-REFERENCE TO RELATED APPLICATION

This application is based on and claims priority of Chinese Patent Application No. 201510846937.5, filed on Nov. 27, 2015, which is incorporated herein by reference in its entirety.

TECHNICAL FIELD

The present disclosure generally relates to the field of computer technology, and more particularly, to a method, an apparatus, and a system for automatically repairing a device.

BACKGROUND

With continuous development of electronic technology, household appliances are becoming increasingly smart, and more and more smart devices begin to incorporate functions of fault detection and automatic repair.

The smart device may generally be provided with a protection apparatus. After a fault is detected locally (e.g., it is detected that the user erroneously sets setting items of the smart device, or that the smart device has been working for such a considerably long time that performances of its components are changed), the protection apparatus may be triggered to operate. At this time, an automatic repair approach adopted by some smart devices is to restart automatically, while an automatic repair approach adopted by some other smart devices is to initialize user settings.

Inventors of the disclosure find at least a problem with the conventional solutions as follows.

With the above process, the smart device can only repair a fault based on a fixed automatic repair approach, which often cannot solve the fault. As a result, the current automatic repair is not very effective.

SUMMARY

According to a first aspect, there is provided a method of automatically repairing a smart device. In the method, an apparatus receives a fault detection request transmitted by the smart device, where the fault detection request includes at least one current value of at least one preset parameter item of the smart device. The apparatus determines whether the at least one current value is within a preset range according to a first value characteristic. When it is determined that the at least one current value is within the preset range, the apparatus obtains first fault repair information corresponding to the first value characteristic from a correspondence table. The apparatus transmits the first fault repair information to the smart device, so that the smart device is automatically repaired according to the first fault repair information.

According to a second aspect, there is provided a method of automatically repairing a smart device. The method includes: obtaining at least one current value of at least one preset parameter item; transmitting a fault detection request to a server, the fault detection request carrying the at least one current value of the at least one preset parameter item; receiving first fault repair information transmitted by the server, and automatically repairing the smart device according to the first fault repair information.

According to a third aspect, there is provided a server, including: a first reception module configured to receive a fault detection request transmitted by a smart device, the fault detection request carrying at least one current value of at least one preset parameter item of the smart device; an obtaining module configured to obtain, from correspondences between preset value characteristics and respective fault repair information, first fault repair information corresponding to a first value characteristic in the correspondences, if it is determined according to the correspondences that the at least one current value of the at least one preset parameter item complies with a first value characteristic in the correspondences; and a first transmission module configured to transmit the first fault repair information to the smart device, so that the smart device is automatically repaired according to the first fault repair information.

According to a fourth aspect, there is provided a smart device, including: an obtaining module configured to obtain at least one current value of at least one preset parameter item; a first transmission module configured to transmit a fault detection request to a server, the fault detection request carrying the at least one current value of the at least one preset parameter item; a first repair module configured to receive first fault repair information transmitted by the server and automatically repair the smart device according to the first fault repair information.

According to a fifth aspect, there is provided an apparatus for automatically repairing a smart device, including: a processor; and a memory configured to store instructions which can be executed by the processor. The processor is configured to: receive a fault detection request transmitted by the smart device, the fault detection request carrying at least one current value of at least one preset parameter item of the smart device; obtain, from correspondences between preset value characteristics and respective fault repair information, first fault repair information corresponding to a first value characteristic in the correspondences, if it is determined according to the correspondences that the at least one current value of the at least one preset parameter item complies with the first value characteristic in the correspondences; and transmit the first fault repair information to the smart device, so that the smart device is automatically repaired according to the first fault repair information.

According to a sixth aspect, there is provided an apparatus for automatically repairing a smart device, including: a processor; and a memory configured to store instructions which can be executed by the processor. The processor is configured to: obtain at least one current value of at least one preset parameter item; transmit a fault detection request to a server, the fault detection request carrying the at least one current value of the at least one preset parameter item; receive first fault repair information transmitted by the server, and automatically repair the smart device according to the first fault repair information.

According to a seventh aspect, there is provided a system for automatically repairing a smart device, including a server and the smart system. The server is configured to receive a fault detection request transmitted by the smart device, the fault detection request carrying at least one current value of at least one preset parameter item of the smart device; obtain, from correspondences between preset value characteristics and respective fault repair information, first fault repair information corresponding to a first value characteristic in the correspondences, if it is determined according to the correspondences that the at least one current value of the at least one preset parameter item complies with the first value characteristic in the correspondences; and transmit the first fault repair information to the smart device. The smart device is configured to obtain the at least one current value of the at least one preset parameter item; transmit the fault detection request to the server, the fault detection request carrying the at least one current value of the at least one preset parameter item; receive the first fault repair information transmitted by the server, and automatically repair the smart device according to the first fault repair information.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Figure 1:
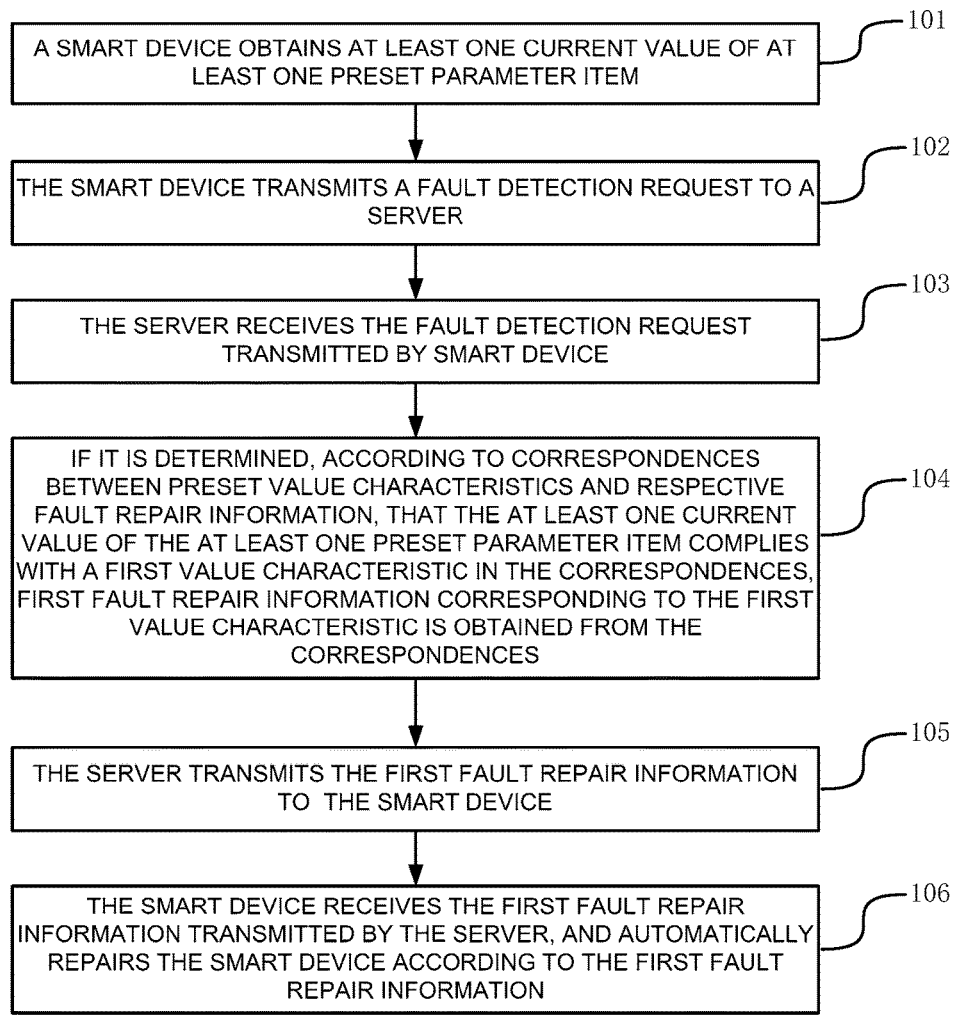
FIG. 1 is a flowchart illustrating a method of automatically repairing a device according to an exemplary embodiment.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Hereinafter, embodiments of the present disclosure will be described in detail with reference to the drawings, in order to make objects, technical solutions and advantages of the present disclosure more apparent.

In one aspect, the present disclosure provides a method of automatically repairing a smart device, which may be implemented by the smart device and a server together. The smart device may be any of smart devices with automatic repair functions, including e.g., smart home devices such as a smart TV, a smart refrigerator, or any electronic device including a processor. The smart device may include a processor, a memory accessible to the processor, a communication component, and a backup element. The processor may be configured to handle the process of automatic repair, the memory may store data required and generated in the processing which will be described below, the communication component may receive and transmit data, and the backup element may be a backup element for an element on the smart device which is prone to be subject to faults. The smart device may also include other input and output interfaces such as: for example, a screen, an input unit etc. The screen may be configured to display fault repair information etc., and may be a touch screen; and the input unit may be used for the user to input instructions for the smart device, and may be a keyboard or a control key etc.

The server may be a server which is built up by a manufacturer of the smart device for addressing the fault of the smart device, and the server may be provided with a processor, a memory, a communication component. The processor may be configured to process the fault detection request transmitted by the smart device, and the communication component may be used for data interaction with the smart device. The server may be further provided with e.g. a screen, an input unit etc. The screen may be configured to display e.g. the fault repair information, and may be a touch screen; and the input unit may be used by technicians for inputting instructions for the server, and may be a keyboard or a control key etc. The present embodiment is exemplified by taking the smart home device as the smart device for illustrating the technical solution thereof. Other examples are possible and similar to this example, and the description thereof will be omitted in the present embodiment for simplicity.

Figure 2A:
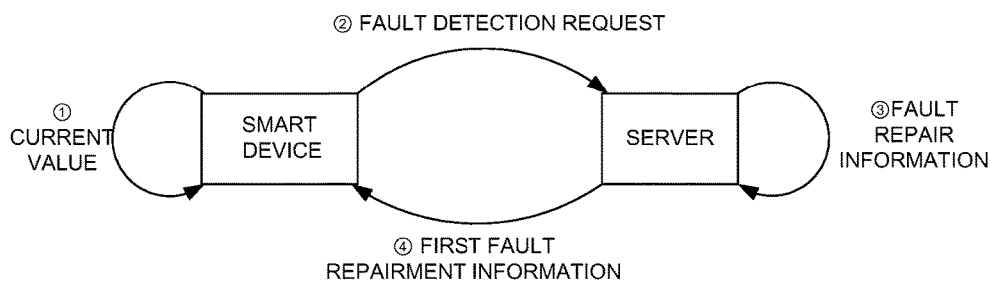
FIG. 2a and FIG. 2b are framework diagrams illustrating a system for automatically repairing a device according to an exemplary embodiment.

Hereinafter, an embodiment will be described in detail with reference to the process as shown in FIG. 1 and the system framework diagram as shown in FIG. 2a.

In step 101, a smart device obtains at least one current value of at least one preset parameter item.

The at least one preset parameter item may be some of operating parameters of a preset component (which may be determined by a technician at a server side) when the smart device works, such as a voltage value, an electric current value, a working temperature, an operation duration or an internal pressure of the component, or may be one or more status parameters of the component, such as a life cycle, a volume size or a power limit of the component. The at least one current value may be a value of each preset parameter item obtained at a current time during the operation of the smart device, or may be a plurality of values of each preset parameter item obtained in a preset period before the current time during the operation of the smart device.

In an implementation, when the smart device enters a working state, it may monitor its local operating status, and obtain the current value of the reset parameter item.

Alternatively or additionally, the smart device may set a way of triggering obtaining the current value of the preset parameter item. There may be two feasible ways provided as follows.

One of the ways is to obtain the at least one current value of the at least one preset parameter item each time a preset detection period is reached.

In an implementation, the smart device may preset the detection period for the smart device. Accordingly, the operating state of each of the components is detected at a certain regular interval, so as to obtain the current value of the preset parameter item. As such, the smart device may automatically perform the fault detection periodically, and may address any of faults occurring on the smart device timely and effectively.

The other way is to obtain the at least one current value of the at least one preset parameter item when a fault detection instruction is received.

In an implementation, when the user needs to detect whether there is a fault in the smart device, he/she may actuate a fault detection button on the smart device, so that the smart device may receive the fault detection instruction, detect the operating state of each of the components of the smart device, and obtain the at least one current value of the at least one preset parameter item.

In step 102, the smart device transmits a fault detection request to a server.

The fault detection request may carry the at least one current value of the at least one preset parameter item. Alternatively or additionally, the fault detection request may include a voltage signal corresponding to the current value.

In an implementation, after the at least one current value of the at least one preset parameter item of the smart device is obtained, the smart device may generate the fault detection request carrying the at least one current value of the at least one preset parameter item, and then transmit the fault detection request to the server by the communication component, so that the server may detect whether there is a fault in the smart device according to the at least one current value of the at least one preset parameter item of the smart device.

Alternatively or additionally, the smart device may first determine whether there is a local fault; and if so, the smart device may transmit the fault detection request to the server.

Accordingly, step 102 may be implemented as: transmitting the fault detection request to the server if there is at least one preset parameter item having a current value falling outside a pre-stored standard value range of the at least one preset parameter item.

In an implementation, the smart device may have the standard value range of the preset parameter item pre-stored therein, which refers to a value range within which the current value of the preset parameter item should fall when the smart device is in a normal working state or a state free of any fault. After obtaining the at least one current value of the at least one preset parameter item, the smart device may determine whether the current value of each of the at least one preset parameter item satisfies the corresponding standard value range. If there is one or more present parameter items having current values not within the corresponding standard value ranges, the smart device may be regarded as having a fault, and thus may transmit the fault detection request to the server.

In step 103, the server receives the fault detection request transmitted from the smart device.

In an implementation, after the smart device transmits the fault detection request, the server may receive the fault detection request, and obtain the at least one current value of the at least one preset parameter item of the smart device carried in the fault detection request.

In step 104, if the server determines, according to correspondences between preset value characteristics and respective fault repair information, that the at least one current value of the at least one preset parameter item complies with a first value characteristic in the correspondences, the server obtains first fault repair information corresponding to the first value characteristic from the correspondences.

A value characteristic of a preset parameter item may be a particular value or value range of the preset parameter item. For example, the server may determine whether the at least one current value is within a preset range according to a first value characteristic. When it is determined that the at least one current value is within the preset range, the server may obtain first fault repair information corresponding to the first value characteristic from a correspondence table.

In an implementation, the technician at the server side may analyze the smart device subject to different potential faults, and record value characteristics of respective preset parameter items in the smart device subject to different potential faults. Meanwhile, the technician may determine repair approaches (and hence fault repair information) for repairing the respective faults, and then store the value characteristics of the preset parameter items and the corresponding fault repair information in the server. After the server receives the at least one current value of the at least one preset parameter value transmitted by the smart device, it may extract the current value of each of the at least one present parameter item, and determine which of the value characteristics of the preset parameter item in the correspondences the current value complies with. After determination has been made for the current values of all of the at least one preset parameter item, the server can determine the first value characteristic with which the preset parameter item of the smart device complies, and thus obtain from the correspondences the repair approach, i.e., the first fault repair information, corresponding to the first value characteristic. The correspondences may include a correspondence table, a data file, or a database, etc. For example, an example correspondence table is shown in Table 1, in which a possible implementation of the above solution is presented.

Other possible implementations are also possible for the solution, and the description thereof is omitted here.

TABLE 1

| Value Characteristic | Fault Repair Information |
| --- | --- |
| Value Of Parameter Item A Is Within Value Range 1 | Fault Repair Information 1 |
| Value Of Parameter Item B Is Within Value Range 2 | Fault Repair Information 2 |
| Value Of Parameter Item C Is Within Value Range 3 and Value Of Parameter Item E Is Within Value Range 5 | Fault Repair Information 3 |
| Value Of Parameter Item D Is Within Value Range 4 and Value Of Parameter Item F Is Within Value Range 6 | Fault Repair Information 4 |

Alternatively or additionally, the server may first determine a fault type of the smart device according to the at least one current value of the at least one preset parameter item in the smart device, and then determine the fault repair information corresponding to the fault type. Accordingly, step 104 may be implemented as follows: if it is determined, according to correspondences between preset value characteristics and respective fault types, that the current value of the preset parameter item complies with the first value characteristic in the correspondences, determining a first fault type corresponding to the first value characteristic; and determining the first fault repair information corresponding to the first fault type according to pre-stored correspondences between fault types and respective fault repair information.

In an implementation, when the technician at the server side records value characteristics of respective preset parameter items in the smart device subject to different potential faults, he may record corresponding fault types simultaneously provide corresponding repair approaches (and fault repair information) for repairing the corresponding types of faults, and then store in the server the correspondences among the value characteristics of the preset parameter items, the fault types and respective fault repair information. After the server receives the at least one current value of the at least one preset parameter item transmitted by the smart device, it may extract the current value of each of the at least one preset parameter item, and determine which of the value characteristics of the preset parameter item in the correspondences the current value complies with. After determination has been made for the current values of all of the at least one preset parameter item, the server can determine the first value characteristic with which the preset parameter item of the smart device complies, then may determine the first fault type of the smart device, and thus obtain the repair apparatus, i.e., the first fault repair information, corresponding to the first fault type.

Alternatively or additionally, the current value of the preset parameter item in the smart device may comply with a plurality of value characteristics. In this case, the server may determine whether the at least one current value is within the plurality of preset ranges according to the correspondence table including: value characteristics, fault types, and fault probabilities. The server may select the fault type corresponding to the highest fault probability from the plurality of fault types corresponding to the plurality of preset ranges. The server may obtain the first fault repair information corresponding to the fault type.

Alternatively or additionally, the server may first determine the fault type with a highest possibility to which the fault of the smart device belongs, and then perform subsequent processing. Accordingly, step 104 may be implemented as: when it is determined, according to correspondences among preset value characteristics, fault types and respective fault probabilities, that the current value of the preset parameter item complies with at least one value characteristic in the correspondences, the server determines the at least one fault type and the at least one fault probability corresponding to the at least one value characteristic; determining a first fault type with a highest fault probability among the at least one fault type corresponding to the at least one value characteristic, according to the at least one fault type and the at least one fault probability corresponding to the at least one value characteristic. The server determines the first fault repair information corresponding to the first fault type, according to pre-stored correspondences between the fault types and the respective fault repair information.

In an implementation, value characteristics of a preset parameter item corresponding to different fault types may have value ranges overlapped with each other. For example, the first value characteristic is a value being within a range of (10, 20) and the second value characteristic is a value being within a range of (15, 25). For example, when the current value of the preset parameter item of the smart device is 17, it may be determined that the current value of the preset parameter item complies with both the above two value characteristics simultaneously. The technician may set, according to analysis and conclusion, that in the overlapped value range between a plurality of value characteristics, different fault types correspond to respective fault probabilities. For example, the above two value characteristics correspond to a first fault type and a second fault type respectively. On the value range (15, 20), a fault probability of the first fault type may be set to be 80% and a fault probability of the second fault type may be set to be 70%. After the server receives the at least one current value of the at least one preset parameter item transmitted by the smart device, it may extract the current value of each of the at least one preset parameter item, and determine which of the value characteristics of the preset parameter item in the correspondences the current value complies with. After determination has been made for the current values of all of the at least one preset parameter item, the server may determine all the value characteristics with which the preset parameter item of the smart device complies, and obtain the fault types and the fault probabilities corresponding to these value characteristics. Then, the server may select the fault type with the highest fault probability, i.e., the first fault type, based on the fault probabilities, and then obtain the repair approach, i.e., the first fault repair information, corresponding to the first fault type. The correspondences may be as shown in FIG. 2. For example, the current value of Parameter Item A is m, which is within Value Range 1, Value Range 4, Value Range 10 and Value Range 19. These value ranges correspond respectively to Fault Type A, Fault Type B, Fault Type E and Fault Type H, whose fault probabilities are respectively 80%, 70%, 50% and 30%. In this example, Fault Type A (i.e., the first fault type) corresponding to the highest fault probability 80% may be selected, and thus the fault repair information 1 (i.e., the first fault repair information) corresponding to the fault type A may be determined.

TABLE 2

| Value Characteristic | Fault Type | Fault Probability | Fault Repair Information |
| --- | --- | --- | --- |
| Value Of Parameter Item A Is Within Value Range 1 | Fault Type A | 80% | Fault Repair Information 1 |
| Value Of Parameter Item A Is Within Value Range 2 | Fault Type A | 70% | Fault Repair Information 1 |

TABLE 2-continued

| Value Characteristic | Fault Type | Fault Probability | Fault Repair Information |
|---|---|---|---|
| . | . | . | . |
| Value Of Parameter Item B Is Within Value Range 3 | Fault Type B | 80% | Fault Repair Information 2 |
| Value Of Parameter Item A Is Within Value Range 4 | Fault Type B | 70% | Fault Repair Information 2 |
| . | . | . | . |
| Value Of Parameter Item C Is Within Value Range 5 | Fault Type C | 80% | Fault Repair Information 3 |
| Value Of Parameter Item B Is Within Value Range 6 | Fault Type C | 70% | Fault Repair Information 3 |
| . | . | . | . |
| Value Of Parameter Item D Is Within Value Range 7 | Fault Type D | 80% | Fault Repair Information 4 |
| Value Of Parameter Item E Is Within Value Range 8 | Fault Type D | 70% | Fault Repair Information 4 |
| . | . | . | . |

In step 105, the server transmits the first fault repair information to the smart device.

In an implementation, after the server obtains, from the pre-stored correspondences between the value characteristics of preset parameter items and the respective fault repair information, the first fault repair information for repairing the corresponding fault in the smart device, it may transmit the first fault repair information to the smart device by the communication component.

In step 106, the smart device receives the first fault repair information transmitted by the server, and is automatically repaired according to the first fault repair information.

In an implementation, the smart device may receive, by the communication component, the first fault repair information transmitted from the server. A file format of the first fault repair information may be a driving program or a running script of a fault repair component. Thus, the smart device may cause its processor to operate according to the first fault repair information, so that the smart device can repair its fault according to the first fault repair information.

Alternatively or additionally, the user may decide whether to use the first fault repair information for repairing the smart device. The corresponding process may include: displaying, by the smart device, the first fault repair information; and automatically repairing the smart device according to the first fault repair information, if a repair confirmation instruction is received.

In an implementation, after the smart device receives the first fault repair information transmitted from the server, it may display the first fault repair information on a screen, and the user may decide whether to repair the fault according to this approach. If the user approves that the smart device repairs itself according to the first fault repair information, he/she may click a repair confirmation key on the smart device. Then, the smart device may receive the repair confirmation instruction, and in turn may be automatically repaired according to the first fault repair information.

Figure 2B:
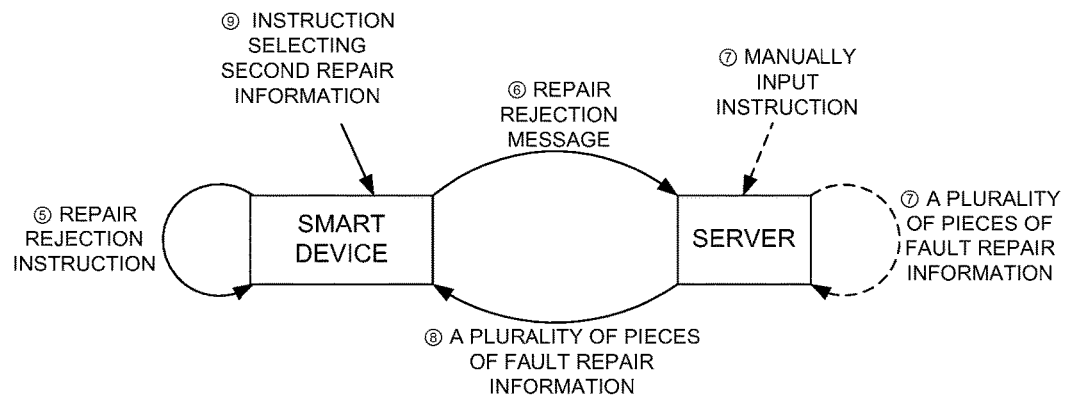
Figure 4:
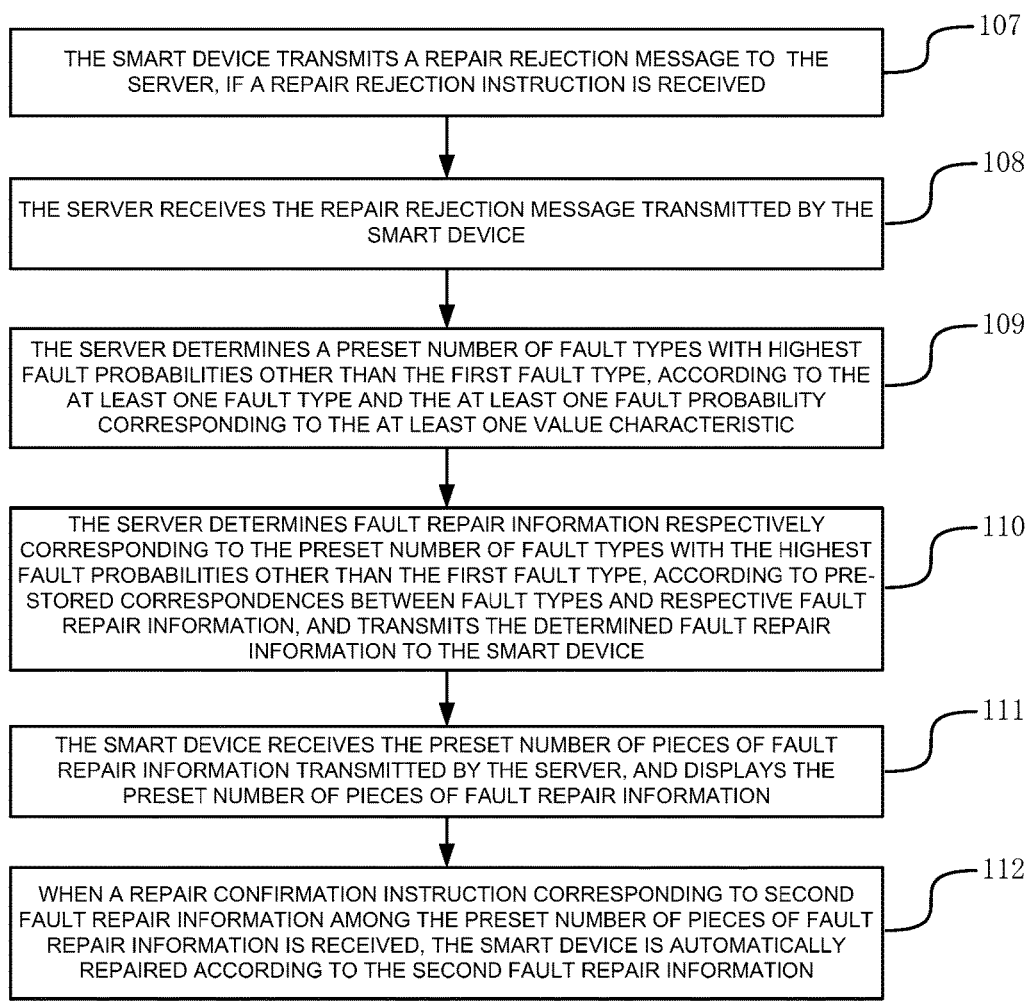
FIG. 4 is a flowchart illustrating a method of automatically repairing a device according to an exemplary embodiment.

Alternatively or additionally, the present embodiment further provides a process performed after step 106 in case the user refuses to use the first fault repair information. A flowchart of the process is shown in FIG. 4 and a related system framework is shown in FIG. 2b.

In step 107, if a repair rejection instruction is received, a repair rejection message is transmitted to the server.

In an implementation, after the smart device receives the first fault repair information transmitted from the server, it may display the first fault repair information on the screen, and the user may decide whether to repair the fault according to this approach. If the user disapproves that the smart device repairs itself according to the first fault repair information, he may click a repair rejection key on the smart device. Then, the smart device may receive the repair rejection instruction, and in turn may transmit the repair rejection message to the server.

In step 108, the server receives the repair rejection message transmitted by the smart device.

In step 109, the server determines a preset number of fault types with highest fault probabilities other than the first fault type, according to the at least one fault type and the at least one fault probability corresponding to the at least one value characteristic.

In an implementation, after the server receives the repair rejection message transmitted by the smart device, it may select, among the fault types and fault probabilities corresponding to all of value characteristics with which the determined preset parameter item complies, a preset number of fault types with highest fault probabilities other than the first fault type. For example, referring to Table 2 and taking an example where the first fault type is fault type A, it can be seen that the fault probability corresponding to Fault Type A is 80%. Since the fault repair information 1 has been denied by the user and the preset number is 2, 2 fault types with the highest fault probabilities other than Fault Type A are selected from the 4 fault types with which the current value m of the parameter item A complies. Since the fault probabilities of Fault Type B, Fault Type E, Fault Type H are respectively 70%, 50%, 30%, Fault Type B whose fault probability is 70% and Fault Type E whose fault probability is 50% are selected.

In step 110, the server determines fault repair information respectively corresponding to the preset number of fault types with the highest fault probabilities other than the first fault type, according to the pre-stored correspondences between the fault types and the respective fault repair information, and transmits the fault repair information to the smart device.

In an implementation, after the server determines the preset number of fault types with the highest fault probabilities other than the first fault type, it may look up, in the correspondences, all fault repair information corresponding respectively to the above fault types, so as to transmit the preset number of pieces of fault repair information to the smart device. In the above example of step 109, the server transmits e.g. Fault Repair Information 2 and Fault Repair Information 5 respectively corresponding to Fault Type B and Fault Type E to the smart device.

In step 111, the smart device receives the preset number of pieces of fault repair information transmitted by the server, and displays the preset number of pieces of fault repair information.

Figure 3:
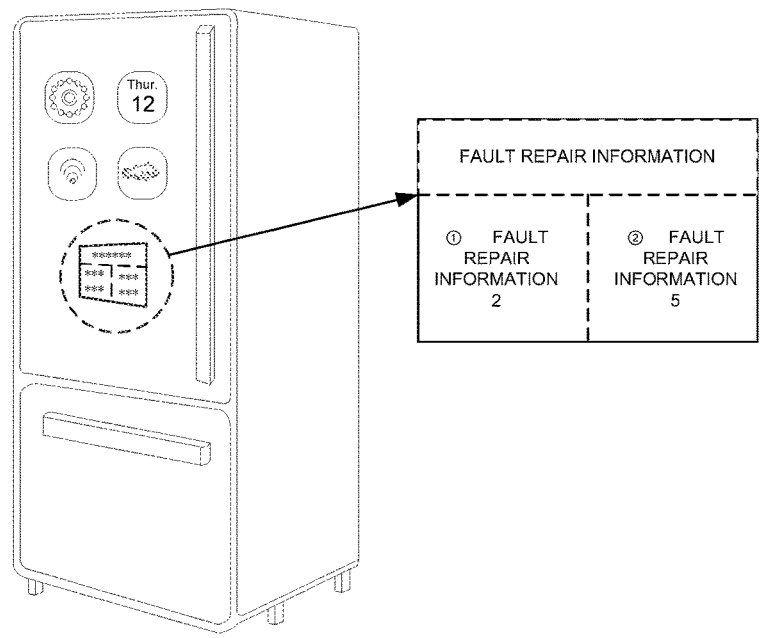
FIG. 3 is a schematic diagram illustrating display of fault repair information according to an exemplary embodiment.

In an implementation, the smart device may receive the preset number of pieces of fault repair information transmitted by the server, and display the preset number of pieces of fault repair information simultaneously/sequentially on the screen of the smart device, so that the user may know specific contents of all the fault repair information. Further, in the above example of step 110, the smart device may display Fault Repair Information 2 and Fault Repair Information 5 on the screen of the smart device, as shown in FIG. 3.

In step 112, when a repair confirmation instruction corresponding to second fault repair information among the preset number of pieces of fault repair information is received, the smart device is repaired according to the second fault repair information.

In an implementation, the user may select one of the above preset number of pieces of fault repair information (i.e., the second fault repair information), and click the repair confirmation key on the smart device. As such, the smart device may receive the repair confirmation instruction for the second fault repair information, and in turn may be automatically repaired according to the second fault repair information.

In addition, after the server receives the repair rejection message transmitted by the smart device, the following process may be performed besides the process as shown in FIG. 2b: after receiving the repair rejection message transmitted by the smart device, displaying repair rejection prompt information; receiving a repair information input instruction that carries fault repair information which is input manually; and transmitting, to the smart device, the fault repair information which is input manually.

In an implementation, after the server receives the repair rejection message transmitted by the smart device, it may display the repair rejection prompt information, so as to prompt the technician at the server side to address the fault on the smart device manually. Here, the repair rejection prompt information may be rendered as a prompt light or a prompt ringtone etc. The technician may manually input the fault repair information after analyzing the current values of all of preset parameter items transmitted by the smart device. As such, the server may receive the repair information input instruction which carries the manually input fault repair information, and then may transmit the manually input fault repair information to the smart device. In addition, the technician may add the manually input fault repair information to the above correspondences, and determine the corresponding value characteristic by analyzing the current value of the preset parameter item.

The present solution may provide different repair approaches for different types of faults of the smart device, including the following three fault repair approaches for example.

Approach One

The first fault repair information includes a corrected value of a fault parameter item, and the smart device adjusts a current value of the fault parameter item to the corrected value.

In this approach, the fault parameter item may be one of the at least one preset parameter item whose current value is abnormal.

In an implementation, the first fault repair information may include a name of the fault parameter item and the corrected value of the fault parameter item. When the smart device is automatically repaired, the current value of the fault parameter item may be adjusted to the corrected value.

Approach Two

The first fault repair information includes a fault parameter item, and the smart device adjusts a current value of the fault parameter item to a preset initial value. In an implementation, the first fault repair information may include only the fault parameter item. When the smart device is automatically repaired, the current value of the fault parameter item may be directly adjusted to the preset initial value.

Approach Three

The first fault repair information indicates a faulty element; and the faulty element being used is replaced with a pre-installed backup element for the faulty element.

In an implementation, the first fault repair information may indicate the faulty element. When the smart device is automatically repaired, the faulty element being used may be automatically replaced by the pre-installed backup element for the faulty element.

In the present disclosure, the fault detection request transmitted by a smart device is received, the fault detection request carrying the current value of the preset parameter item of the smart device; if it is determined, according to the correspondences between preset value characteristics and respective fault repair information, that the current value of the preset parameter item complies with the first value characteristic in the correspondences, the first fault repair information corresponding to the first value characteristic is obtained from the correspondences; and the first fault repair information is transmitted to the smart device, so that the smart device is automatically repaired according to the first fault repair information. As such, targeted repair approaches may be adopted according to different fault conditions. Thus, the effectiveness of automatic repair of the smart device may be improved.

Figure 5:
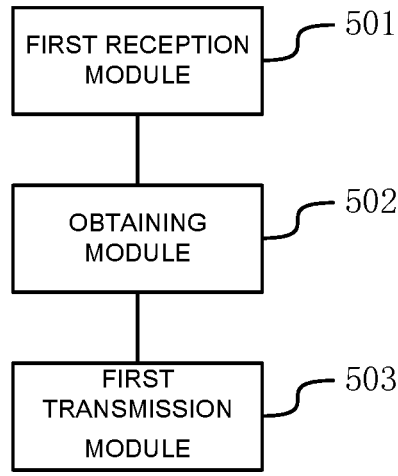
FIG. 5 is a block diagram illustrating a structure of an apparatus for automatically repairing a device according to an exemplary embodiment.

In another aspect, the present disclosure provides a server. As shown in FIG. 5, the server includes the following modules.

A first reception module 501 is configured to receive a fault detection request from a smart device, the fault detection request carrying at least one current value of at least one preset parameter item of the smart device. The fault detection request may be transmitted by the smart device directly or indirectly to the server.

An obtaining module 502 is configured to obtain, from correspondences between preset value characteristics and respective fault repair information, first fault repair information corresponding to a first value characteristic in the correspondences, if it is determined according to the correspondences that the at least one current value of the at least one preset parameter item complies with the first value characteristic in the correspondence.

A first transmission module 503 is configured to transmit the first fault repair information to the smart device, so that the smart device is automatically repaired according to the first fault repair information.

Figure 6:
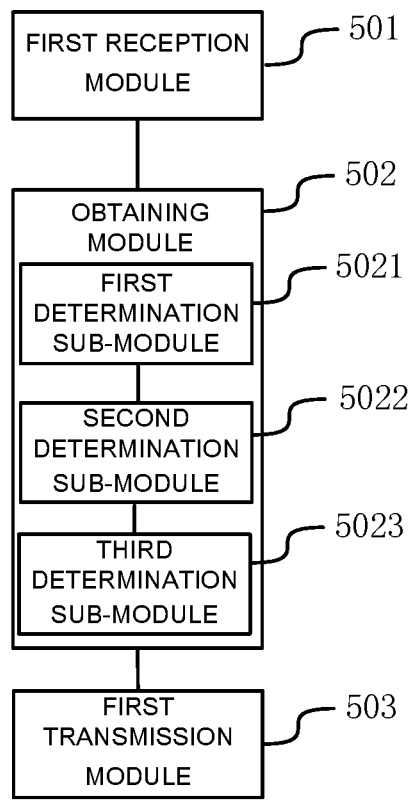
FIG. 6 is a block diagram illustrating a structure of an apparatus for automatically repairing a device according to an exemplary embodiment.

Alternatively or additionally, as shown in FIG. 6, the obtaining module 502 includes the following sub-modules.

A first determination sub-module 5021 is configured to: if it is determined, according to correspondences among the preset value characteristics, fault types and respective fault probabilities, that the current value of the preset parameter item complies with at least one value characteristic in the correspondences, determine at least one fault type and at least one fault probability corresponding to the at least one value characteristic.

A second determination sub-module 5022 is configured to determine a first fault type with a highest fault probability among the at least one fault type corresponding to the at least one value characteristic, according to the at least one fault type and the at least one fault probability corresponding to the at least one value characteristic.

A third determination sub-module 5023 is configured to determine the first fault repair information corresponding to the first fault type, according to pre-stored correspondences between fault types and respective fault repair information.

Figure 7:
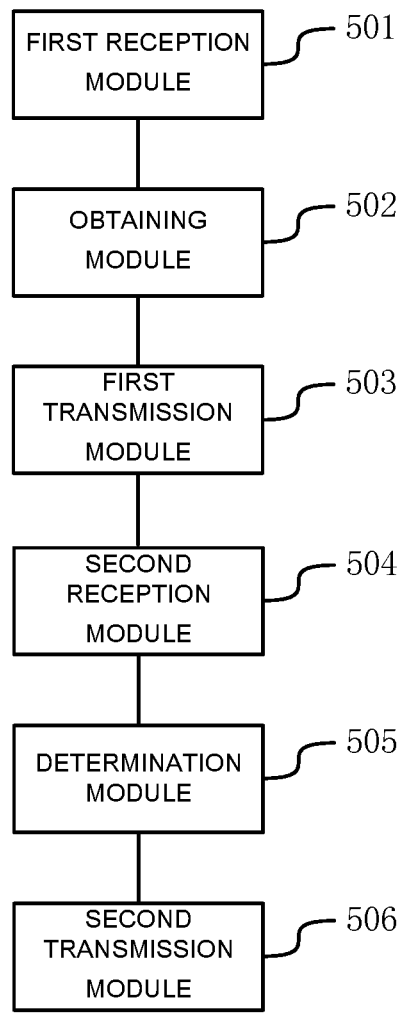
FIG. 7 is a block diagram illustrating a structure of an apparatus for automatically repairing a device according to an exemplary embodiment.

Alternatively or additionally, as shown in FIG. 7, the server further includes the following modules.

A second reception module 504 is configured to receive a repair rejection message transmitted by the smart device.

A determination module 505 is configured to determine a preset number of fault types with highest fault probabilities other than the first fault type, according to the at least one fault type and the at least one fault probability corresponding to the at least one value characteristic.

A second transmission module 506 is configured to determine fault repair information respectively corresponding to the preset number of fault types with the highest fault probabilities other than the first fault type, according to the pre-stored correspondences between the fault types and the respective fault repair information, and transmit the determined fault repair information to the smart device.

Figure 8:
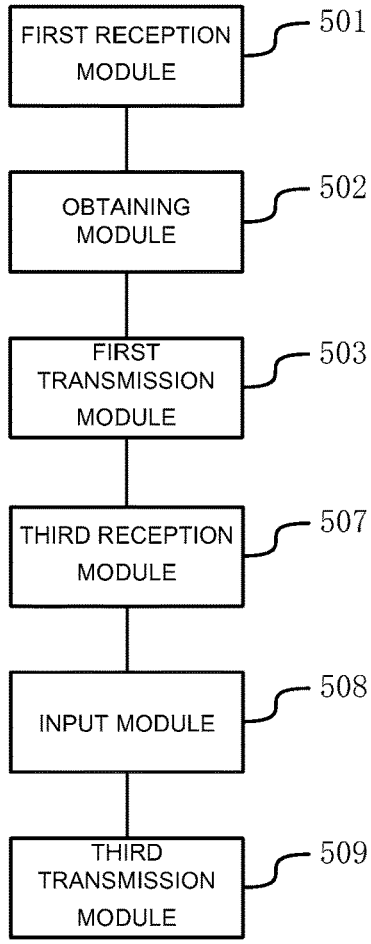
FIG. 8 is a block diagram illustrating a structure of an apparatus for automatically repairing a device according to an exemplary embodiment.

Alternatively or additionally, as shown in FIG. 8, the server further includes the following modules.

A third reception module 507 is configured to receive a repair rejection message transmitted by the smart device, and display repair rejection prompt information.

An input module 508 is configured to receive a repair information input instruction that carries fault repair information which is input manually.

A third transmission module 509 is configured to transmit, to the smart device, the fault repair information which is input manually.

Figure 9:
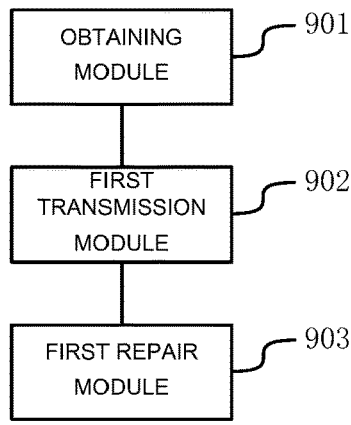
FIG. 9 is a block diagram illustrating a structure of an apparatus for automatically repairing a device according to an exemplary embodiment.

Based on the same technical concept, another exemplary embodiment of the present disclosure provides a smart device. As shown in FIG. 9, the smart device includes the following modules.

An obtaining module 901 is configured to obtain at least one current value of at least one preset parameter item.

A first transmission module 902 is configured to transmit a fault detection request to a server, the fault detection request carrying the at least one current value of the at least one preset parameter item.

A first repair module 903 is configured to receive first fault repair information transmitted by the server, and automatically repair the smart device according to the first fault repair information.

Alternatively or additionally, the obtaining module 901 is configured to: obtain the current value of the preset parameter item each time a preset detection period is reached; or obtain the current value of the preset parameter item when a fault detection instruction is received.

Alternatively or additionally, the first transmission module 902 is configured to: transmit the fault detection request to the server, if there is at least one preset parameter item having a current value falling outside a pre-stored standard value range of the at least one preset parameter item.

Figure 10:
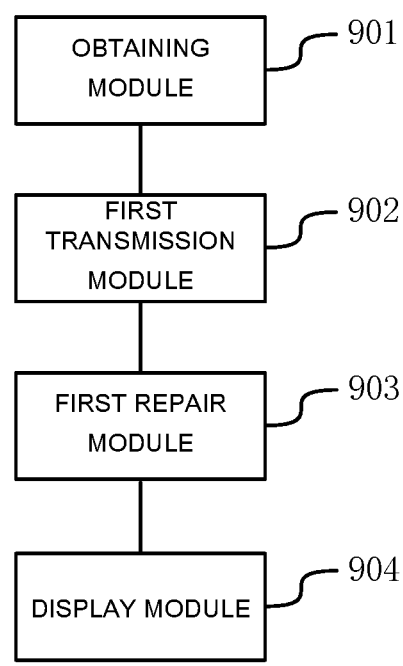
FIG. 10 is a block diagram illustrating a structure of an apparatus for automatically repairing a device according to an exemplary embodiment.

Alternatively or additionally, as shown in FIG. 10, the smart device further includes: a display module 904 configured to display the first fault repair information. The first repair module 903 is configured to: automatically repair the smart device according to the first fault repair information, if a repair confirmation instruction is received.

Figure 11:
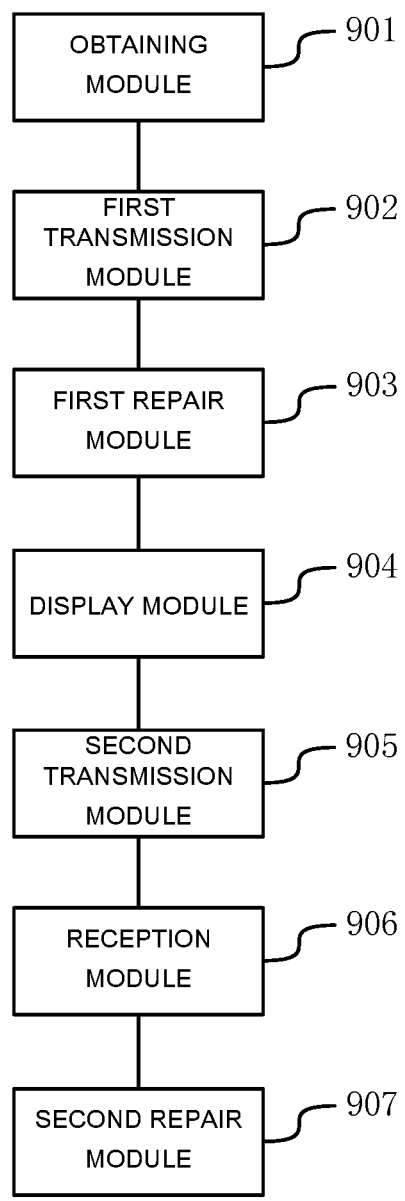
FIG. 11 is a block diagram illustrating a structure of an apparatus for automatically repairing a device according to an exemplary embodiment.

Alternatively or additionally, as shown in FIG. 11, the smart device further includes the following modules.

A second transmission module 905 is configured to transmit a repair rejection message to the server, if a repair rejection instruction is received.

A reception module 906 is configured to receive a preset number of pieces of fault repair information transmitted by the server, and display the preset number of pieces of fault repair information.

A second repair module 907 is configured to, when a repair confirmation instruction corresponding to second fault repair information among the preset number of pieces of fault repair information is received, automatically repair the smart device according to the second fault repair information.

Alternatively or additionally, the first fault repair information includes a corrected value of the fault parameter item. The first repair module 903 is configured to: adjust a current value of the fault parameter item to the corrected value.

Alternatively or additionally, the first fault repair information includes a fault parameter item. The first repair module 903 is configured to: adjust a current value of the fault parameter item to a preset initial value.

Alternatively or additionally, the first fault repair information indicates a faulty element. The first repair module 903 is configured to: replace the faulty element being used with a pre-installed backup element for the faulty element.

In the present disclosure, the fault detection request transmitted by the smart device is received, the fault detection request carrying the current value of the preset parameter item of the smart device; if it is determined, according to the correspondences between preset value characteristics and respective fault repair information, that the current value of the preset parameter item complies with the first value characteristic in the correspondences, the first fault repair information corresponding to the first value characteristic is obtained from the correspondences; and the first fault repair information is transmitted to the smart device, so that the smart device is automatically repaired according to the first fault repair information. As such, targeted repair approaches may be adopted according to different fault conditions. Thus, the effectiveness for automatic repair of the smart device may be improved.

It should be noted that, when the apparatus for automatically repairing a device provided by the above embodiments automatically repairs the device, the above divisions into various functional modules are only described for exemplary illustration. In practical applications, the above functions may be implemented by different functional modules as required, i.e., the internal structure of the apparatus may be divided into different functional modules to realize all or parts of functions as described above. In addition, since the apparatus for automatically repairing a device provided by the above embodiments and the method embodiments of automatically repairing a device belong to the same technical concept, reference can be made to the method embodiments for the implementation of the apparatus, and the description thereof will be omitted here for simplicity.

Based on the same technical concept, another embodiment of the present disclosure provides a system for automatically repairing a smart device. The system includes a server and the smart device.

The server is configured to receive a fault detection request transmitted by the smart device, the fault detection request carrying at least one current value of at least one preset parameter item of the smart device; obtain, from correspondences between preset value characteristics and respective fault repair information, first fault repair information corresponding to a first value characteristic in the correspondences, if it is determined according to the correspondences that the at least one current value of the at least one preset parameter item complies with the first value characteristic in the correspondences; and transmit the first fault repair information to the smart device.

The smart device is configured to obtain the at least one current value of the at least one preset parameter item; transmit the fault detection request to the server, the fault detection request carrying the at least one current value of the at least one preset parameter item; receive the first fault repair information transmitted by the server, and automatically repairing the smart device according to the first fault repair information.

In the present disclosure, the fault detection request transmitted by a smart device is received, where the fault detection request includes the current value of the preset parameter item of the smart device. When it is determined, according to the correspondences between the preset value characteristics and the respective fault repair information, that the current value of the preset parameter item complies with the first value characteristic in the correspondences, the first fault repair information corresponding to the first value characteristic is obtained from the correspondences. The first fault repair information is transmitted to the smart device, so that the smart device is automatically repaired according to the first fault repair information. As such, targeted repair approaches may be adopted according to different fault conditions. Thus, the effectiveness for automatic repair of the smart device may be improved.

Figure 12:
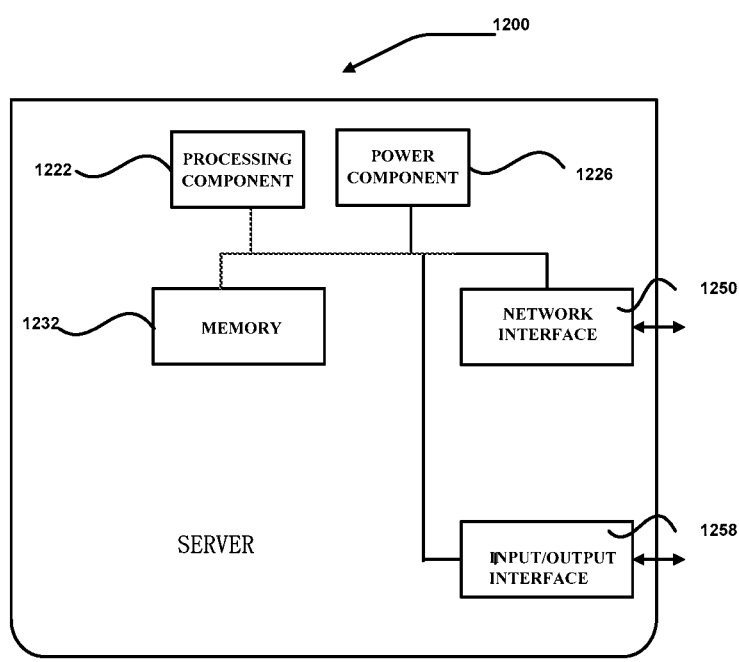
FIG. 12 is a block diagram illustrating a structure of a server according to an exemplary embodiment.

FIG. 12 is a schematic diagram illustrating a structure of a server according to another embodiment of the disclosure. As shown, the server 1200 includes a processing component 1222 which further includes one or more processors, and memory resources represented by a memory 1232 for storing instructions executable by the processing component 1222 such as application. The applications stored in the memory 1232 may include one or more modules, each corresponding to a set of instructions. The processing component 1222 is configured to execute instructions so as to perform the above methods.

The server 1200 may also include a power component 1226 which is configured to execute power management for the server 1200, a wired or wireless network interface 1250 which is configured to connect the server 1200 to a network, and an input/output (I/O) interface 1258. The server 1200 can operate the operation system stored in the memory 1232, for example, Windows Server™, Mac OS X™, Unix™, Linux™, Free BSD™ or the like.

The server 1200 may include a memory, and one or more programs which are stored in the memory. The server is configured to, when instructions contained in the one or more programs are executed by the one or more processors, perform operations of: receiving a fault detection request transmitted by a smart device, the fault detection request carrying at least one current value of at least one preset parameter item of the smart device; obtaining, from correspondences between preset value characteristics and respective fault repair information, first fault repair information corresponding to a first value characteristic from the correspondences, if it is determined according to the correspondences that the at least one current value of the at least one preset parameter item complies with the first value characteristic in the correspondences; and transmitting the first fault repair information to the smart device, so that the smart device is automatically repaired according to the first fault repair information.

Alternatively or additionally, obtaining, from the correspondences between the preset value characteristics and the respective fault repair information, the first fault repair information corresponding to the first value characteristic in the correspondences, if it is determined according to the correspondences that the at least one current value of the at least one preset parameter item complies with the first value characteristic in the correspondences includes: if it is determined, according to correspondences among preset value characteristics, fault types and respective fault probabilities, that the current value of the preset parameter item complies with at least one value characteristic in the correspondences, determining at least one fault type and at least one fault probability corresponding to the at least one value characteristic; determining a first fault type with a highest fault probability among the at least one fault type corresponding to the at least one value characteristic, according to the at least one fault type and the at least one fault probability corresponding to the at least one value characteristic; and determining the first fault repair information corresponding to the first fault type, according to pre-stored correspondences between fault types and respective fault repair information.

Alternatively or additionally, the operations further include: receiving a repair rejection message transmitted by the smart device; determining a preset number of fault types with highest fault probabilities other than the first fault type, according to the at least one fault types and the at least one fault probability corresponding to the at least one value characteristic; and determining fault repair information respectively corresponding to the preset number of fault types with the highest fault probabilities other than the first fault type, according to the pre-stored correspondences between the fault types and the respective fault repair information, and transmitting the determined fault repair information to the smart device.

Alternatively or additionally, the operations further include: receiving a repair rejection message transmitted by the smart device, and displaying repair rejection prompt information; receiving a repair information input instruction that carries fault repair information which is input manually; and transmitting, to the smart device, the fault repair information which is input manually.

In the present disclosure, the fault detection request transmitted by a smart device is received, the fault detection request carrying the current value of the preset parameter item of the smart device; if it is determined, according to the correspondences between the preset value characteristics and the respective fault repair information, that the current value of the preset parameter item complies with the first value characteristic in the correspondences, the first fault repair information corresponding to the first value characteristic is obtained from the correspondences; and the first fault repair information is transmitted to the smart device, so that the smart device is automatically repaired according to the first fault repair information. As such, targeted repair approaches may be adopted according to different fault conditions. Thus, the effectiveness for automatic repair of the smart device may be improved.

Figure 13:
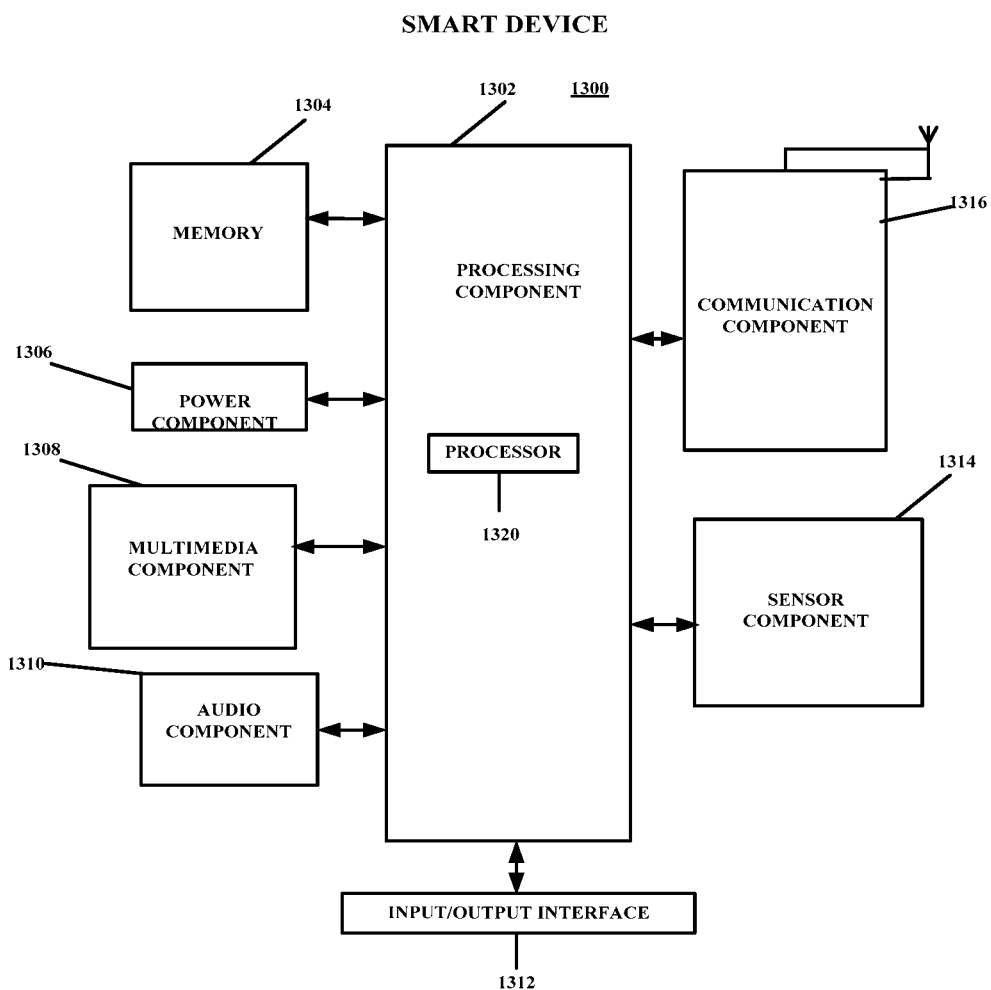
FIG. 13 is a block diagram illustrating a structure of a smart device according to an exemplary embodiment.

FIG. 13 is a schematic diagram illustrating a smart device according to another embodiment of the disclosure. The smart device may be a handset or the like.

As shown, the smart device 1300 may include one or more of the following components: a processing component 1302, a memory 1304, a power component 1306, a multimedia component 1308, an audio component 1310, an input/output (I/O) interface 1312, a sensor component 1314, and a communication component 1316.

The processing component 1302 typically controls overall operations of the smart device 1300, such as the operations associated with display, telephone calls, data communications, camera operations, and recording operations. The processing component 1302 may include one or more processors 1320 to execute instructions to perform all or part of the steps in the above described methods. Moreover, the processing component 1302 may include one or more modules which facilitate the interaction between the processing component 1302 and other components. For instance, the processing component 1302 may include a multimedia module to facilitate the interaction between the multimedia component 1308 and the processing component 1302.

The memory 1304 is configured to store various types of data to support the operation of the smart device 1300. Examples of such data include instructions for any applications or methods operated on the smart device 1300, contact data, phonebook data, messages, pictures, video, etc. The memory 1304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1306 provides power to various components of the smart device 1300. The power component 1306 may include a power management system, one or more power sources, and any other components associated with the generation, management, and distribution of power in the smart device 1300.

The multimedia component 1308 includes a screen providing an output interface between the smart device 1300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1808 includes a front camera and/or a rear camera. The front camera and the rear camera may receive an external multimedia datum while the smart device 1300 is in an operation mode, such as a photographing mode or a video mode. Each of the front camera and the rear camera may be a fixed optical lens system or have focus and optical zoom capability.

The audio component 1310 is configured to output and/or input audio signals. For example, the audio component 1310 includes a microphone ("MIC") configured to receive an external audio signal when the smart device 1300 is in an operation mode, such as a call mode, a recording mode, and a voice recognition mode. The received audio signal may be further stored in the memory 1304 or transmitted via the communication component 1316. In some embodiments, the audio component 1310 further includes a speaker to output audio signals.

The I/O interface 1312 provides an interface between the processing component 1302 and peripheral interface modules, such as a keyboard, a click wheel, buttons, and the like. The buttons may include, but are not limited to, a home button, a volume button, a starting button, and a locking button.

The sensor component 1314 includes one or more sensors to provide status assessments of various aspects of the smart device 1300. For instance, the sensor component 1314 may detect an open/closed status of the smart device 1300, relative positioning of components, e.g., the display and the keypad, of the smart device 1300, a change in position of the smart device 1300 or a component of the smart device 1300, a presence or absence of user contact with the smart device 1300, an orientation or an acceleration/deceleration of the smart device 1300, and a change in temperature of the smart device 1300. The sensor component 1314 may include a proximity sensor configured to detect the presence of nearby objects without any physical contact. The sensor component 1314 may also include a light sensor, such as a CMOS or CCD image sensor, for use in imaging applications. In some embodiments, the sensor component 1314 may also include an accelerometer sensor, a gyroscope sensor, a magnetic sensor, a pressure sensor, or a temperature sensor.

The communication component 1316 is configured to facilitate communication, wired or wirelessly, between the smart device 1300 and other devices. The smart device 1300 can access a wireless network based on a communication standard, such as WiFi, 2G or 3G or a combination thereof. In one embodiment, the communication component 1316 receives a broadcast signal or broadcast associated information from an external broadcast management system via a broadcast channel. In one embodiment, the communication component 1316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the smart device 1300 may be implemented with one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus may use the circuitries in combination with the other hardware or software components for performing the above described methods. Each module, sub-module, unit, or sub-unit in the disclosure may be implemented at least partially using the one or more circuitries.

In an embodiment, there is also provided a non-transitory computer readable storage medium including instructions, such as included in the memory 1304, executable by the processor 1320 in the smart device 1300, for performing the above-described methods. For example, the non-transitory computer-readable storage medium may be a ROM, a RAM, a CD-ROM, a magnetic tape, a floppy disc, an optical data storage device, and the like.

There is provided a non-transitory computer-readable storage medium having stored therein instructions that, when executed by a processor of a smart device, cause the smart device to perform a method of automatically repairing the smart device device. The method includes: obtaining at least one current value of at least one preset parameter item; transmitting a fault detection request to a server, the fault detection request carrying the at least one current value of the at least one preset parameter item; receiving first fault repair information transmitted by the server, and automatically repairing the smart device according to the first fault repair information.

Alternatively or additionally, obtaining the current value of the preset parameter item includes: obtaining the current value of the preset parameter item each time a preset detection period is reached; or obtaining the current value of the preset parameter item when a fault detection instruction is received.

Alternatively or additionally, transmitting the fault detection request to the server includes: transmitting the fault detection request to the server, if there is at least one preset parameter item having a current value falling outside a pre-stored standard value range of the at least one preset parameter item.

Alternatively or additionally, after the first fault repair information transmitted by the server is received, the method further includes: displaying the first fault repair information. Automatically repairing the smart device according to the first fault repair information includes: automatically repairing the smart device according to the first fault repair information, if a repair confirmation instruction is received.

Alternatively or additionally, the method further includes: transmitting a repair rejection message to the server, if a repair rejection instruction is received; receiving a preset number of pieces of fault repair information transmitted by the server, and displaying the preset number of pieces of fault repair information; and when a repair confirmation instruction corresponding to second fault repair information in the preset number of pieces of fault repair information is received, automatically repairing the smart device according to the second fault repair information.

Alternatively or additionally, the first fault repair information includes a corrected value of a fault parameter item. Automatically repairing the smart device according to the first fault repair information includes: adjusting a current value of the fault parameter item to the corrected value.

Alternatively or additionally, the first fault repair information includes a fault parameter item. Automatically repairing the smart device according to the first fault repair information includes: adjusting a current value of the fault parameter item to a preset initial value.

Alternatively or additionally, the first fault repair information indicates a faulty element. Automatically repairing the smart device according to the first fault repair information includes: replacing the faulty element being used with a pre-installed backup element for the faulty element.

In the present disclosure, the fault detection request transmitted by a smart device is received, the fault detection request carrying the current value of the preset parameter item of the smart device; if it is determined, according to the correspondences between preset value characteristics and the respective fault repair information, that the current value of the preset parameter item complies with the first value characteristic in the correspondences, the first fault repair information corresponding to the first value characteristic is obtained from the correspondences; and the first fault repair information is transmitted to the smart device, so that the smart device is automatically repaired according to the first fault repair information. As such, targeted repair approaches may be adopted according to different fault conditions. Thus, the effectiveness for automatic repair of the smart device may be improved.

It can be appreciated by those skilled in the art that all or a part of the steps of the above embodiments may be implemented through hardware or through programs that instructs related hardware. The programs may be stored on a computer-readable storage medium which may be a read-only memory, a magnetic or optical disk, or the like.

The foregoing are only preferred embodiments of the disclosure, and do not intend to limit the disclosure. Any variation, equivalent substitution or modification that falls within the spirit and principle of the present disclosure should be encompassed by the protection scope of the disclosure.

We claim:

1. A method for automatically repairing a smart device, comprising:
receiving a fault detection request from the smart device, the fault detection request carrying at least one current value of at least one preset parameter item of the smart device;
determining whether the at least one current value is within a preset range according to a first value characteristic; when it is determined that the at least one current value is within the preset range, obtaining first fault repair information corresponding to the first value characteristic from a preset correspondence table;
transmitting the first fault repair information to the smart device, so that the smart device is automatically repaired according to the first fault repair information;
determining whether the at least one current value is within a plurality of preset ranges according to the correspondence table including: value characteristics, fault types, and prestored fault probabilities corresponding to fault types;
selecting a fault type corresponding to a highest prestored fault probability from a plurality of fault types corresponding to the plurality of preset ranges; and
obtaining the first fault repair information corresponding to the fault type.

2. The method of claim 1, wherein obtaining the first fault repair information corresponding to the first value characteristic from the correspondence table comprises:
if it is determined, according to correspondences among preset value characteristics, fault types, and respective fault probabilities, that the at least one current value of the at least one preset parameter item complies with at least one value characteristic in the correspondences, determining at least one fault type and at least one fault probability corresponding to the at least one value characteristic;
determining a first fault type with a highest fault probability among the at least one fault type corresponding to the at least one value characteristic, according to the at least one fault type and the at least one fault probability corresponding to the at least one value characteristic; and
determining the first fault repair information corresponding to the first fault type, according to pre-stored correspondences between fault types and respective fault repair information.

3. The method of claim 2, further comprising:
receiving a repair rejection message transmitted by the smart device;
determining a preset number of fault types with highest fault probabilities other than the first fault type, according to the at least one fault type and the at least one fault probability corresponding to the at least one value characteristic; and
determining fault repair information respectively corresponding to the preset number of fault types with the highest fault probabilities other than the first fault type, according to the pre-stored correspondences between the fault types and the respective fault repair information, and transmitting the determined fault repair information to the smart device.

4. The method of claim 1, further comprising:
receiving a repair rejection message transmitted by the smart device, and displaying repair rejection prompt information on the smart device;
receiving a repair information input instruction that carries fault repair information that is input manually; and
transmitting, to the smart device, the fault repair information which is input manually.

5. A method for automatically repairing a smart device, comprising:
obtaining at least one current value of at least one preset parameter item;

transmitting a fault detection request to a server, the fault detection request carrying the at least one current value of the at least one preset parameter item; and receiving first fault repair information transmitted by the server, and automatically repairing the smart device according to the first fault repair information, wherein the first fault repair information is selected by a server according to a fault type corresponding to a highest prestored fault probability from a plurality of fault types corresponding to a plurality of preset ranges covering the at least one current value.

6. The method of claim 5, wherein obtaining the at least one current value of the at least one preset parameter item comprises:

obtaining the at least one current value of the at least one preset parameter item each time a preset detection period is reached; and obtaining the at least one current value of the at least one preset parameter item when a fault detection instruction is received.

7. The method of claim 5, wherein transmitting the fault detection request to the server comprises:

transmitting the fault detection request to the server when there is at least one preset parameter item having a current value falling outside a pre-stored standard value range of the at least one preset parameter item.

8. The method of claim 5, wherein after the first fault repair information transmitted by the server is received, the method further comprises: displaying the first fault repair information; and wherein automatically repairing the smart device according to the first fault repair information comprises: automatically repairing the smart device according to the first fault repair information when a repair confirmation instruction is received.

9. The method of claim 8, further comprising:

transmitting a repair rejection message to the server when a repair rejection instruction is received;

receiving a preset number of pieces of fault repair information transmitted by the server; displaying the preset number of pieces of fault repair information; and when a repair confirmation instruction corresponding to second fault repair information among the preset number of pieces of fault repair information is received, automatically repairing the smart device according to the second fault repair information.

10. The method of claim 5, wherein the first fault repair information comprises a corrected value of a fault parameter item; and wherein automatically repairing the smart device according to the first fault repair information comprises: adjusting a current value of the fault parameter item to the corrected value.

11. The method of claim 5, wherein the first fault repair information comprises a fault parameter item; and wherein automatically repairing the smart device according to the first fault repair information comprises: adjusting a current value of the fault parameter item to a preset initial value.

12. The method of claim 5, wherein the first fault repair information indicates a faulty element; and wherein automatically repairing the smart device according to the first fault repair information comprises: replacing the faulty element being used with a pre-installed backup element for the faulty element.

13. An apparatus for automatically repairing a smart device, comprising:

a processor; and a memory configured to store instructions executable by the processor, wherein the processor is configured to:

receive a fault detection request transmitted by the smart device, the fault detection request carrying at least one current value of at least one preset parameter item of the smart device;

obtain, from a correspondence table including preset value characteristics and respective fault repair information, first fault repair information corresponding to a first value characteristic in the correspondence table when it is determined that the at least one current value of the at least one preset parameter item complies with the first value characteristic in the correspondence table;

transmit the first fault repair information to the smart device, so that the smart device is automatically repaired according to the first fault repair information;

when it is determined, according to correspondences among preset value characteristics, fault types, and respective fault probabilities prestored in the correspondence table, that the at least one current value of the at least one preset parameter item complies with at least one value characteristic in the correspondences, determine at least one fault type and at least one fault probability corresponding to the at least one value characteristic;

determine a first fault type with a highest prestored fault probability among the at least one fault type corresponding to the at least one value characteristic, according to the at least one fault type and the at least one fault probability corresponding to the at least one value characteristic; and determine the first fault repair information corresponding to the first fault type, according to pre-stored correspondences between fault types and respective fault repair information.

14. The apparatus of claim 13, wherein the processor is further configured to:

receive a repair rejection message transmitted by the smart device;

determine a preset number of fault types with highest fault probabilities other than the first fault type, according to the at least one fault type and the at least one fault probability corresponding to the at least one value characteristic; and determine fault repair information respectively corresponding to the preset number of fault types with the highest fault probabilities other than the first fault type, according to the pre-stored correspondences between the fault types and the respective fault repair information, and transmit the determined fault repair information to the smart device.

15. The apparatus of claim 13, wherein the processor is further configured to:

receive a repair rejection message transmitted by the smart device, and display repair rejection prompt information;

receive a repair information input instruction that carries fault repair information which is input manually; and transmit, to the smart device, the fault repair information which is input manually.

* * * * *